Jan. 31, 1961  J. H. V. FINNEY, JR  2,969,878
BELT TYPE SOLID SEPARATOR

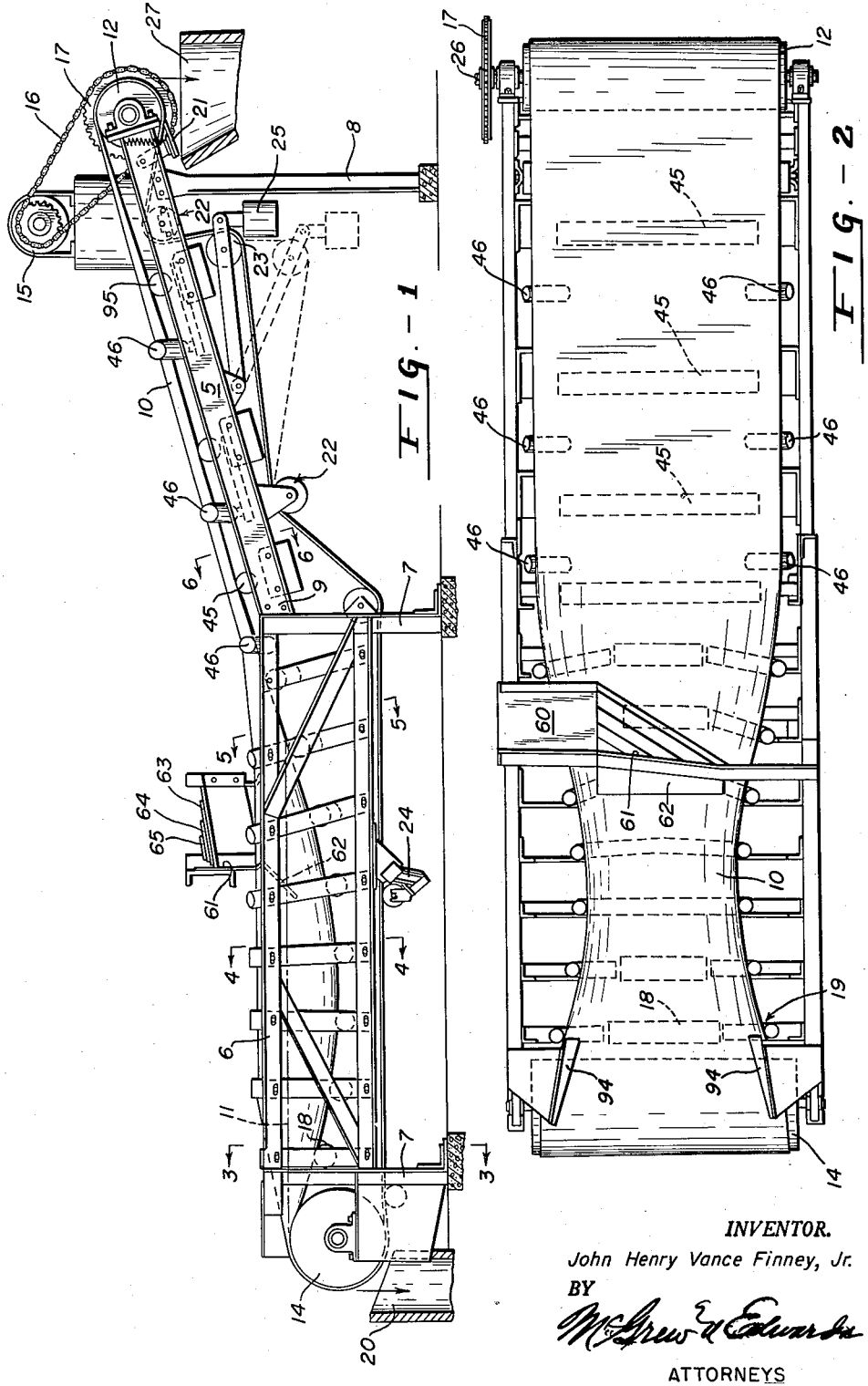

Filed Aug. 9, 1954  5 Sheets-Sheet 2

INVENTOR.
John Henry Vance Finney, Jr.
BY
ATTORNEYS

INVENTOR.
John Henry Vance Finney, Jr.
BY
ATTORNEYS

Jan. 31, 1961 J. H. V. FINNEY, JR 2,969,878
BELT TYPE SOLID SEPARATOR

Filed Aug. 9, 1954 5 Sheets-Sheet 4

INVENTOR.
John Henry Vance Finney, Jr.
BY

ATTORNEYS

Jan. 31, 1961    J. H. V. FINNEY, JR    2,969,878
BELT TYPE SOLID SEPARATOR
Filed Aug. 9, 1954    5 Sheets-Sheet 5

INVENTOR.
John Henry Vance Finney, Jr
BY
*McGrew & Edwards*
ATTORNEYS

United States Patent Office 2,969,878
Patented Jan. 31, 1961

2,969,878

BELT TYPE SOLID SEPARATOR

John H. V. Finney, Jr., Denver, Colo., assignor, by mesne assignments, to Denver Equipment Company, Denver, Colo., a corporation of Colorado Filed Aug. 9, 1954, Ser. No. 448,639

5 Claims. (Cl. 209—430)

This invention relates to apparatus for treating suspended solids in liquid, and more particularly to classification apparatus for separating settled solids from a suspended solid-liquid composition. The apparatus may be advantageously utilized as a dewaterer, heavy media separator and like apparatus, as well as a classifier.

Wet classification, in general, is an operation in which a mass of grains or particles of mixed sizes and/or different specific gravities settle through a fluid which may be in motion or rest. While water is ordinarily used, other liquids and fluids may be used. The essential action of a classifier is based on the differential rates of settling of particles from a slurry. Several types of mechanical classifiers have been used in industry for the separation of coarse from fine, or heavy from light particles. Such classifiers provide a pool into which a slurry to be treated is fed, and continuous classifiers include endless drags, oscillating rakes, spiral ribbon classifiers and the like, for removing settled solids from a pool of slurry of suspended solids in liquid. The liquid and fines remaining in suspension pass out the pool with the overflow.

The common devices for removing settled solids directly interfere with the effectiveness of the settling operation of the pool, and, further, are substantially inflexible. The devices are essentially designed and built for a specific process and are not readily adaptable to different processes requiring a different type or degree of classification. For example, a rake or spiral classifier is designed for a specific slope of tank bottom which is changed only with substantial modification and reconstruction.

The present invention is an improvement of my Patent No. 2,417,477, issued March 18, 1947. In general, the apparatus comprises an endless belt suspended on a frame which includes a pair of pulleys defining the limits of the track of the belt. The frame supports a series of guiding rollers or idlers which deform a portion of the belt, at one end of the frame, to form a trough-like receptacle or pool section for holding a pool of pulp or slurry. The guide rollers warp the belt edges upwardly, so that the edges are higher than the adjacent end pulley, and they also permit the middle of the belt to sag lower than the top of the end pulley thereby forming a trough-shaped receptacle. The remaining portion of the belt, which is a sand conveying and elevating section or draining deck, extends upwardly from the pool for conveying and elevating any solids which settle from the pool of pulp onto the belt. The frame, also, provides a section of guide rollers for substantially flattening the belt as it rises above the pool level. The belt travels under the pool, which is fed with a slurry of material to be treated, and up the conveying and elevating section thereby picking up settled solids and removing them from the pool, while liquid and suspended solids flow from the pool across the lower pulley which provides the pool overflow.

While belt-type classifiers, and like apparatus, have been known, for example my Patent No. 2,417,477, their use has been extremely limited. One major difficulty has been the lack of a belt capable of stretch and shrink deformation. The pool portion of the belt classifier is made by turning up the edges of the belt and at the same time permitting the center of the belt to sag, forming the trough-like pool. The distance between sections across the pool at right angles to the belt travel when measured along the center is not equal to the distance measured along the edges of the belt. The length of the center of the belt longitudinally across the pool is not equal to the length of the edges of the belt longitudinally along the pool. A belt to be capable of forming such a pool must provide a stretch-shrink differential between center and edges to accommodate the distortion of the belt dimensions. Common type rubber belting having cord, fabric, cloth, etc. reinforcing is arranged so as to be essentially non-elastic in all dimensions and will not, therefore, deform into such a pool as required in a belt classifier. Furthermore, such common type belting assumes a typical or natural rectangular cross-section when its edges are turned up and then flattened out again.

The present invention recognizes that a continuous belt having a pool-defining portion of the type described above will have a cross sectional shape that is a natural result of the pool-forming distortion. As a consequence an arrangement of supports such as rollers conforming to this shaping will permit the belt to distort sufficiently to satisfy the shaping requirements without the formation of creases that seriously impair belt wear and functioning. The belt in forming the pool portion has a natural tendency to assume a cross-sectional shape consisting of an intermediate flat portion and two upright edge portions interconnected therewith. Supports are provided to support and maintain the belt in the pool shape. Such belt classifiers require ability for dimensional distortion of the belt in a relatively short distance, and common belting is not capable of such distortion, in continuous operation. The inelastic properties of common belt prevent it from being repeatedly deformed into the desired cross section; it assumes flat planes, i.e., an essentially rectangular cross section, and it creases at the intersection of the planes.

Included among the objects and advantages of the present invention is to provide a novel conveyor belt which can be warped or distorted with sufficient stretch and shrink differential to form a pool for a belt classifier on a continuous basis. Also, the invention provides novel means for forming a pool overflow while using essentially cylindrical end pulleys. Belt training idlers are, further, provided for preventing side slippage of the belt and the dumping of the material over the belt side under uneven sand loads. Means are provided for changing the slope of the sand conveying and elevating section of the classifier without changing the size or shape or slope of the pool, which provides for varying the drainage of the elevated sand without disturbing the settling pool. Novel feed means of the invention provide for utilizing the device as classifier, dewaterer, heavy media separator, etc.

These and other objects and advantages of the invention may be readily ascertained by referring to the drawings, in which:

Figure 1 is a side elevation of the assembled device according to the invention;

Figure 2 is a top plan view of the device shown in Fig. 1;

Figure 3:
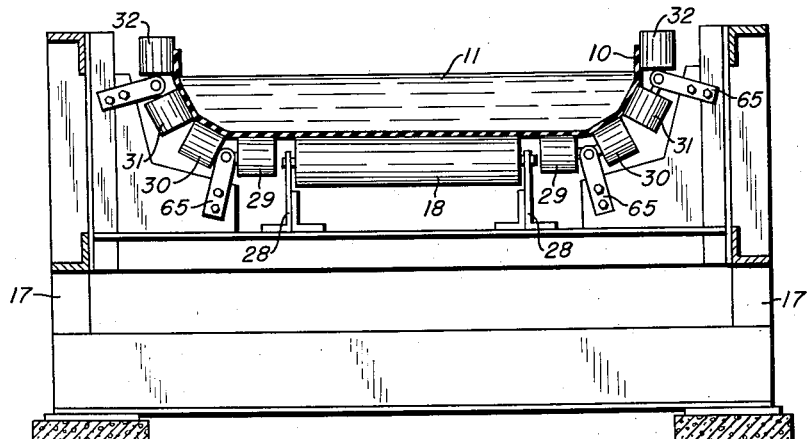
Figure 3 is a cross sectional view of the frame and the belt arrangement taken along section line 3—3 immediately adjacent the lower pulley.
Figure 4:
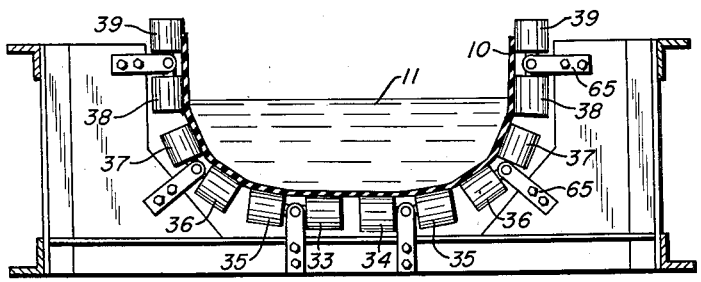
Figure 4 is a cross sectional view of a frame and belt, taken along section line 4—4, at about the maximum depth of the pool.
Figure 5:
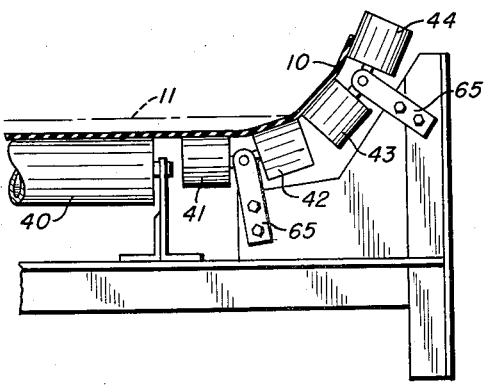
Figure 5 is a cross sectional view of the frame and belt, taken along section line 5—5, immediately prior to the sand conveying and elevating section.
Figure 6:
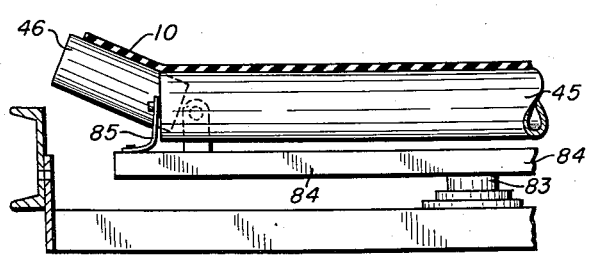
Figure 6 is a cross sectional view of the frame and belt of the sand conveying and elevating section, taken along section line 6—6.

In the device illustrated in Figures 1, 3 and 6, an endless belt 10 is suspended between an upper essentially cylindrical pulley 12 and a lower essentially cylindrical pulley 14 secured in a supporting frame. While either end pulley may be used for driving the belt, the upper pulley provides a more or less convenient location since it is away from the liquid at the lower end of the frame. A gear motor 15 drives the upper pulley by means of a chain drive 16 and a drive sprocket 17 secured to the shaft 26 of the cylindrical pulley 12. The upper stretch of the belt provides, in general, two sections; a first or pool portion or section and a second or sand conveying and elevating flight portion or section. The lower or pool section of the belt includes a plurality of troughing rollers which warp the belt into a trough-shaped receptacle having a volume and a defined size for maintaining a pool of the pulp subject to continuous feed and discharge. The end pulleys are essentially cylindrical in that they may have a slight crown, or be the shape of standard type pulleys to accommodate the size of belt, without substantial variations from a cylindrical pulley.

The frame comprises an upper section 5 and a lower section 6 joined together by a movable connection 9. The lower frame section is supported on a pair of supports 7 and the upper section is supported by a support 8. The slope of the upper section 5 may be changed by increasing or decreasing the length of support 8, and the slope of the section is changed without changing the slope or the size or shape of the pool. In a classifier where the pool is about 10 feet long and the sand conveying and elevating portion is about 9 feet long, a change in height of about four inches in the support 8 will change the slope of the upper portion by about one-half inch per foot.

Each set of troughing rollers in the pool portion includes at least one substantially horizontal roller which is spaced below the top edge of the lower pulley 14 and supports the center portion of the belt in a sagging position to form the bottom of the pool. Each set, also, includes rollers extending upwardly from the ends of the cylindrical roller to warp or turn the sides of the belt upwardly, forming the sides of the pool. The troughing rollers are so placed that the edge of the belt is above the surface of cylindrical pulley 14, to prevent discharge of slurry over the sides of the pool. The discharge of liquid and suspended solids from the pool is across the overflow pulley 14 into the outlet 20. The guide or troughing idler next adjacent the cylindrical pulley 14 includes a substantially horizontal roller 18 supporting the center of the belt, which forms the bottom of the pool, and a series of troughing rollers extending upwardly from the horizontal idler 18 for warping the belt edges upwardly to form the sides of the pool. The idler 18 is positioned high enough to permit the edge of the belt to be warped above the top of pulley 14, and yet low enough to permit the belt center to sag below the apex of the cylindrical pulley. Each succeeding set of troughing idlers narrows the pool by permitting the belt center to sag lower and raising the edges of the belt to a maximum depth of the pool at about section line 4—4. The succeeding idlers thereafter raise the bottom pool and permit the belt to flatten into the configuration of the sand conveying and elevating section above the pool. The edges of the belt in the conveying and elevating section are warped upwardly for holding the sand for discharge over the pulley 12 into sand discharge 27, and to guide liquid draining from the sand back into the pool.

The belt travels around the upper pulley 12 past a rubber scraper 21, which scrapes sand from the belt, over a return idler 22, a take-up idler 23 and a series of return idlers 22 to the pulley 14. A training idler 24 underneath the pool is utilized to maintain lower stretch of the belt in position on the return idlers and pulleys. The gravity take-up idler 23 includes a weighted box 25 for maintaining the proper tension on the belt. While the classifier illustrated demonstrates the use of take-up idlers, other designs and modifications of the belt classifiers do not require such take-up idlers, or similar devices.

The troughing idlers along section 3—3, Figure 3, include the horizontal idler 18 carried on support 28. Extending laterally and upwardly from the horizontal idler 18 are a series of four idlers 29, 30, 31 and 32 which progressively warp the belt from horizontal position to substantially vertical position. The four small troughing idlers are positioned to raise the sides of the belt substantially above the level pool 11.

The idlers at section 4—4 include a pair of small idlers 33 and 34 which are maintained in substantially horizontal position to support the pool bottom. Five side idlers, 35, 36, 37, 38 and 39 warp the belt edges from horizontal to vertical position, and the idlers are, also, placed to warp the belt edges substantially above the pool level 11.

The idlers at section 5—5 include a horizontal idler 40 and a series of side idlers 41, 42, 43, and 44 which warp the edges of the belt upwardly, but not into a completely vertical position. Since the belt is approaching the more or less flat configuration of the sand conveying and elevating portion above the pool level, the sides of the belt do not need to be turned completely vertical. The edges of the belt at this station are, also, maintained substantially above the pool level.

The configuration of the belt at section 6—6, and thereabove, is substantially flat except for a slight upturn of the sides of the belt. This section is the sand conveying and elevating portion of the classifier, and settled solids from the pool ride the belt upwardly for discharge over the upper pulley into the sand discharge. Idlers in this belt section are essentially troughing idlers to provide for the drainage of liquid back into the pool; however, there may be enough training idlers included in the section to provide for belt alinement. As shown, a preferred arrangement includes a series of spaced horizontal idlers 45 and a series of idlers 46 spaced from the idlers 45. The idlers 46 extend only a short distance under the edge of the belt to slightly turn up the belt edge for holding the settled sand thereon and guide the draining liquid back into the pool.

Figure 11:
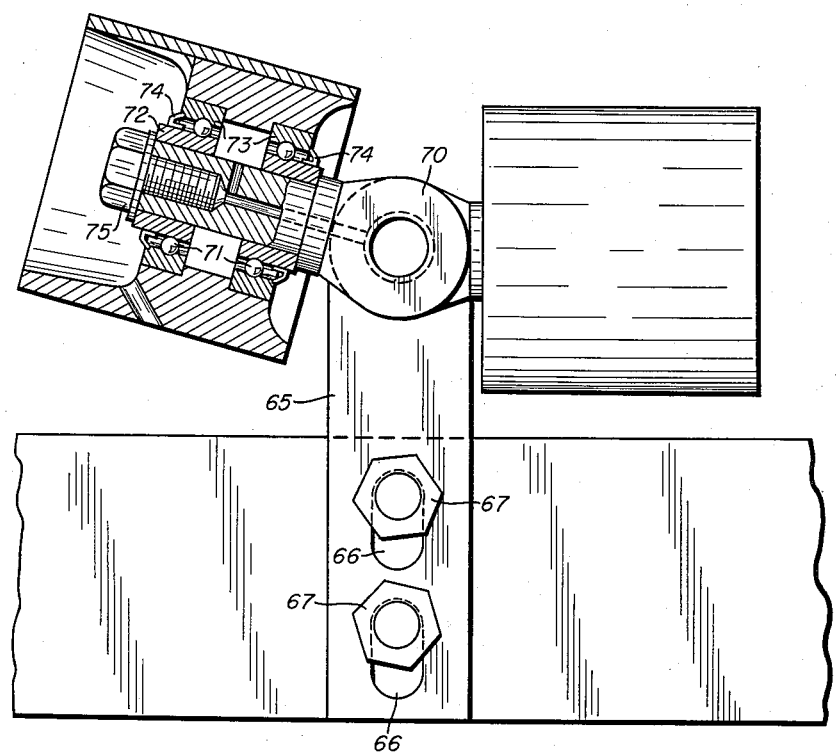
Figure 11 is a side elevation, in partial section, showing the details of a support idler, for warping the belt.
Figure 12:
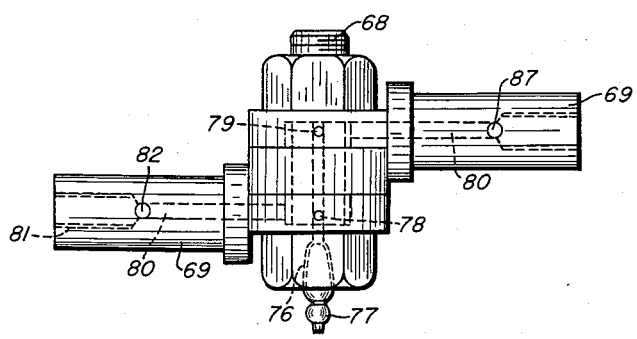
Figure 12 is a plan view of the support and idler shafts assembly.

To warp the belt edges and to maintain the belt in correct pool-forming position, the idlers must be correctly spaced. Also, the face of the rollers must be in flush alinement with the belt to give proper support for the weight of the material in the pool and the belt while maintaining the belt in warped shape. The idler support system shown in Figures 11 and 12 provides adjustment means for changing the angle of the rollers for turning the belt edges upwardly into the desired shape, for varying the distance of the idler rollers from the frame support, and for controlling alignment of the belt. There are various degrees of warping and various angles of support required along the belt extent, and the support shown in Figures 11 and 12 may be used at the various support points along the belt to provide support and warping instead of having specially built supports for each individual point along the belt. To facilitate assembly the adjustable idler supports may be varied to accommodate positions required at different locations. The idler support comprises an upright 65 which may be bolted to the frame through slots 66, so that the height of the upright 65 may be adjusted relative to the frame. A pair of stub roller shafts 69, each having an eye 70 at one end thereof, are bolted on either side of the support 65 by means of a bolt 68 passing through each eye and a hole in the top of the support. The rollers are journalled on the shaft by means of a pair of ball bearings 71 running in inner race 72 and an outer race 73. A seal 74 at each end encloses the bearings, and a bolt 75 secures the assembly on the shaft. The bolt 68 is provided with a bore 76 which is tapped and provided with a grease fitting 77 secured on the head end thereof. A series of lateral holes 78 bored in the approximate position of the eye 70 of one shaft and another series of holes 79 bored in approximate position of the eye of the other shaft provides communicating means from the bore 76. A bore 80 through each stub shaft has an enlarged end section 81 which is tapped to accommodate the bolt for holding the roller on the shaft. Lateral bores 82 provide a communication with the shaft bore 80 which provides communication of the bearings with the grease fitting. The internal bores, therefore, provide means for lubricating the bearings of both rollers from a single grease charging fitting.

Figure 13:
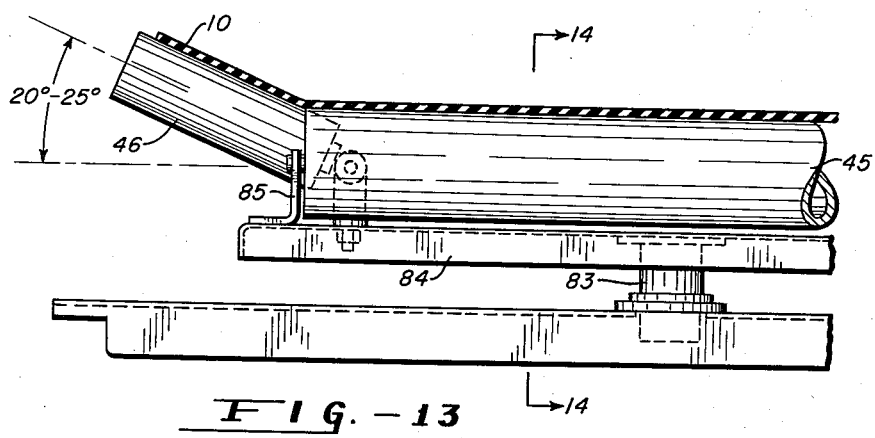
Figure 13 is a side elevation of a training-troughing idler, according to the invention.
Figure 14:
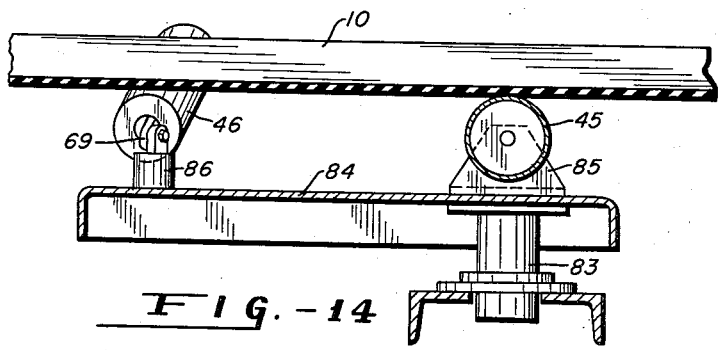
Figure 14 is a cross sectional elevation, taken along section lines 14—14 of Fig. 13.
Figure 15:
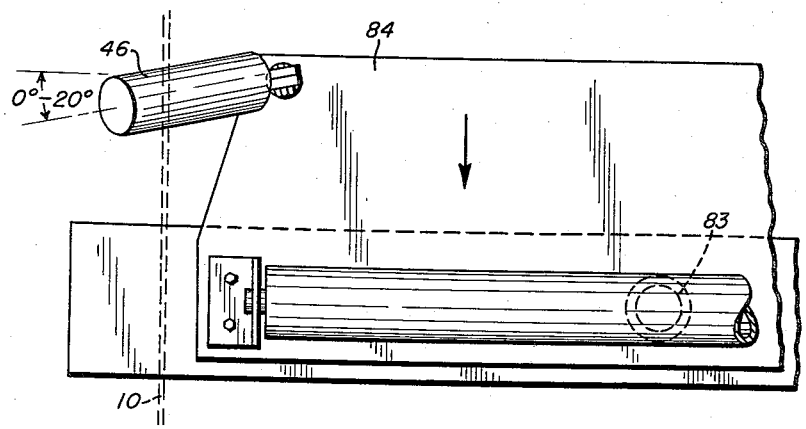
Figure 15 is a top plan view of the training-troughing idler, showing the relation of the idlers in mounted position.

As the belt emerges from the pool, it may carry a substantial load of sand, and the sand, also, carries entrained liquid which drains back into the pool. The belt, therefore, must be troughed for guiding the draining liquid back into the pool. The training-troughing idler system shown in Figures 13 through 15 provides means for aligning the belt through its own sensitivity so as to adjust to accommodate operating conditions under which the belt is running. The training-troughing idler comprises a central pivot bearing 83 which supports a plate 84 thereabove. A pair of brackets 85 mounted near the end of the plate 84 support a large roller 45 centerwise and axially aligned above the pivot 83. A pair of small rollers 46 are supported on the plate 84 at a distance from the axially supported roller 45. Each roller 46 is mounted on a rotatable mount 86 by means of a bolt extending through a roller shaft 69 and the upper portion of the support 86. The support 86 is bolted to the plate 84 and is adapted to rotate about its axes. The support brackets for the roller 86 provides means for adjusting the roller laterally as well as vertically around its support. Under normal operating conditions the roller 46 is maintained at an angle of between 0 and 20° from a line perpendicular to the belt travel. The roller 46 is also maintained at an angle of about 20 to 25° from horizontal, to warp upwardly the edge of the belt to form a trough. The position of these small rollers 46 may be readily changed both vertically and horizontally to give sensitivity for aligning the belt under various operating conditions. When the sand load on the belt is not evenly balanced across the belt, there is a tendency for the belt to creep to one side in an attempt to center the load on the carrying idlers. With the training idlers of Figures 13–15, the belt tends to creep up one of the idlers 46 under uneven lateral loading. As the belt creeps up the idler the pivoted plate 84 turns under the force of the belt turning the idler 45 to an angle which then guides the belt back into alignment. The idlers, therefore, automatically align the belt along the line of travel under uneven loading, where the belt creeps sidewise under the influence of uneven load. The pivotally mounted roller 45 carries the greatest proportion of the weight of the belt and sand load, while the troughing-training idlers 46 trough the belt and provide means for turning the idler system under the influence of a creeping belt to guide the belt back into alignment on the roller 45. The vertically and horizontally adjustable idlers may be variously spaced along the conveying and elevating portion to provide sufficient means aligning the belt and maintaining it in its line of travel, and troughing idlers may be utilized to carry the belt and load weight at other necessary points along the conveying and elevating portion.

As explained above, a belt which will warp into a trough-like receptacle must have portions which stretch and shrink to accommodate the dimensional variations of the pool portion of the belt classifier. While the belt must stretch, it is not feasible to utilize an all rubber belt. The belt must have reinforcing to make it economically feasible to operate such a classifier. The belt of the invention comprises an arrangement of relatively rigid and relatively flexible portions extending lengthwise of the belt in side-by-side relation as an integral unit. In one preferred form, the belt includes a relatively inelastic center portion and a relatively elastic portion extending from each edge thereof. The inelastic portion is a cord, fabric, cloth, etc., reinforced core which is relatively non-elastic in all dimensions.

Figure 7:
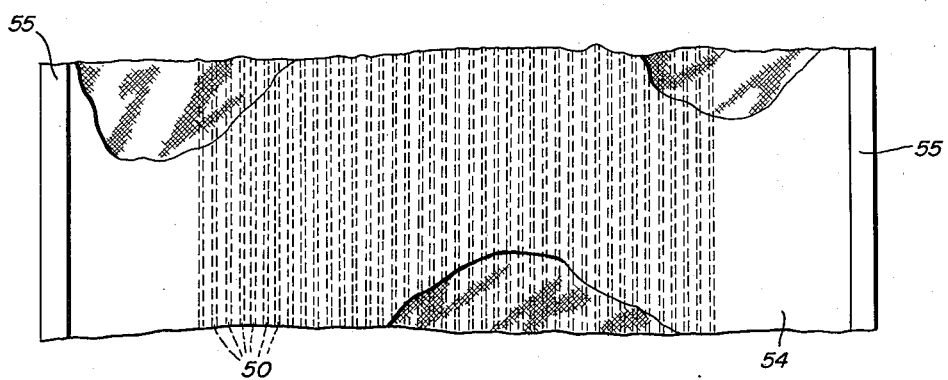
Figure 7 is a top plan view of a belt according to the present invention.
Figure 8:
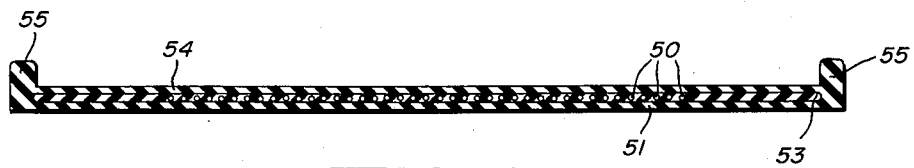
Figure 8 is a cross sectional view of the belt illustrated in Fig. 7.

The belt shown in Figures 7 and 8 comprises a core with a center portion which is reinforced with cord, fabric, cloth, etc. layer which is relatively rigid, or substantially inelastic. The sides beyond the cord layer are substantially all rubber, or a rubber substitute where appropriate, and are elastic enough to stretch and shrink and distort under the influence of the training idlers without damage or causing a permanent set in the belt. The reinforcing layer comprises plural strands of cord, or fabric, 50 incased in a rubber core 51 which extends laterally a substantial distance beyond the cord or fabric center to about the edge of the belt. The rubber core may be covered with a light weight bias cut fabric or cloth of one thickness or transverse cord on each side thereof, and which has slightly overlapping edges 53. A covering of about 1/16 inch rubber 54, about 40–50 durometer, completely encloses the core and bias cut fabric to complete the belt assembly. A short vertical extension 55 of rubber, molded to the belt, extends upwardly on each edge of the belt. The vertical extension or flange 55 must be elastic to provide sufficient seretch to travel around the pulleys. The flange provides sides for the pool overflow over pulley 14 to guide the liquid into the desired conduit. Also, the sides reduce the amount of troughing needed on the conveying and elevating portion to guide the draining liquid back into the pool.

For a 48 inch wide belt, a width on the order of a 32 inch width of cord or fabric or cloth layer is sufficient to permit sufficient warping and stretching of the belt to form a pool and to prevent permanent set of the belt and still carry the required load. The bias cut fabric or transverse cord permits a nominal stretch or folding or distortion of the belt without causing permanent set. The belt stretch and distortion is greatest at about section 3—3, since the difference in travel between the edge and intermediate belt portions at this section is about maximum for the actual distance over which the warping must occur, as the belt moves from a flat position to a trough configuration in a very short distance. The belt with the flexible sides can stretch and shrink without permanent set or cracking of the belt.

Figure 9:
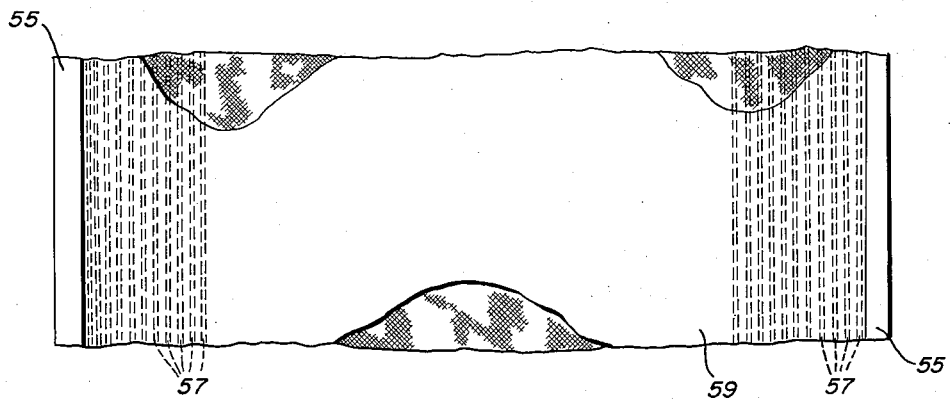
Figure 9 is a top plan view of a modified belt according to the present invention.
Figure 10:
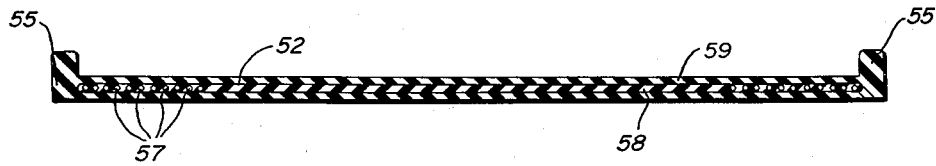
Figure 10 is a cross sectional view of the belt illustrated in Fig. 9.

The belt illustrated in Figures 9 and 10 has a similar construction to the belt of Figures 7 and 8 in that rigid or inelastic and flexible or elastic portions are placed side by side, but the cord or fabric layer is placed along the edges of the belt leaving a flexible rubber center. The belt includes a cord, fabric or cloth layer 57, extending inwardly from adjacent each edge of the belt, incased in a rubber core 58. A bias cut light weight fabric or transverse cord encompasses the core, and a 1/16 inch rubber covering 59 encloses the core to form an integral assembly. The belt is provided with the vertical extensions or flanges 55 for defining the overflow of the pool over the lower pulley and preventing overflow of slurry over the belt sides. In using this belt, the edges of the belt stay substantially unstretched and undistorted, except for vertical extensions 55 which must be capable of stretching. The center, therefore, of the belt must take substantially all the distortion and stretching of the belt as it travels through the device. In both instances, the rubber cover 54 is preferably of about 40-50 durometer, which is tough enough for long wear and still flexible enough for stretching and distortion to which the belt is subjected.

The belt of Figure 7 with the longitudinal core running down the center of the belt carries the sand load in the center where there is the greatest cord or fabric support. The flexible edges permit the belt to warp and stretch without substantial distortion of the relative rigid center portion, which carries a substantial part of the pool load between the idler rollers. In the classifier shown, the idler rollers on the elevating section are some distance apart, and the belt with the center longitudinal cord support is satisfactory to support the load between the idlers. With a belt having the longitudinal side reinforcing core, idlers which are closer together may be required to carry the load.

Due to the very great sand elevating and conveying capacity of the belt of the classifier, a constant speed, for example, on the order of about 15-75 feet per minute, is adequate to handle substantially any load. The lineal speed of the belt may be greatly varied to vary the sand conveying and elevating capacity, without substantially agitating the pool. It may, therefore, be economically desirable to provide a constant speed motor to drive the belt at a constant speed greater than any contemplated sand load carrying capacity, since such operation will not materially affect the operation of the settling pool.

The classifier is provided with a laterally sloped feed launder which feeds slurry to the pool in a line across the middle section thereof. The launder comprises a laterally sloped bottom 60 which debouches across an angle feed outlet 61. The outlet 61 feeds onto a distribution plate 62 which has an end submerged in the pool. A series of triangular piles extend across the feed launder, a large pile 63 extends about three quarters of the way across the launder, an intermediate pile 64 on top of the large pile extends about half way across the launder, and top pile 65 extends about a quarter of the way across the launder. The feed launder distributes the pulp evenly across the feed outlet 61 and hence evenly across the lateral extent of pool of pulp. The distribution plate 62 extends to below the surface of the pool to prevent splashing and undue agitation in the pool from the falling feed.

The pool overflow is over the lower or tail pulley 14. A pair of squeegees 94 positioned along the warped belt edges adjacent the pulley 14 guide the liquid and suspended fine material to the overflow outlet over the pulley. With this arrangement, a flat belt may be used in place of the belts with the side flanges. Where the process permits the use of squeegees, the flat belt is desirable as it is less expensive to manufacture and maintain than the belt with the side flanges.

While the drawing illustrates the preferred form in which the pool overflow is over the lower pulley 14, other modifications may be utilized for various results. It is recognized that for certain purposes the pool may have a side overflow, over the belt edge, rather than over the lower pulley. Suitable guide members may be utilized to deform one side of the pool to provide an overflow for the pool. The pool may be considered as being bounded by three sides and a sloping bottom. The upright belt edges and lower pulley provide the pool sides, and an overflow for the pool may be provided across any of the sides.

The device of the invention has been described in operation as a classifier, but it is very useful as a heavy media separator, a dewaterer, etc. When used as a heavy media separator the feed is fed into the pool with media of proper specific gravity through the feed launder which is of sufficient size and shape to accommodate the increase flow of feed and to insure that middling shall be below the float. The sink and adhering media is adequately handled due to the large conveying and elevating capacity of the belt; likewise, the overflow provides removal of float and adhering media. As a dewaterer in the separation of solids from liquids, the device is admirably suited. The conveying and elevating section provide a drainage deck which not only has a great capacity, but its slope may be quickly and easily changed to suit the conditions. Further, the lineal speed of the belt may readily be changed to give increased capacity without impairing the efficiency of the process.

While the invention has been illustrated by reference to specific illustrations, there is no intent to limit the invention to the precise details set forth, except insofar as provided in the following claims.

I claim:

1. In the art of treating solids in liquids in which a pulp containing a range of solids in a variety of sizes is fed into a pool having a substantially flat bottom portion formed on the distorted surface of a moving readily deformable endless belt, wherein the belt rises above the level of the pool at one end thereof to discharge settled solids from the pool, the improvement which comprises a belt arrangement of a relatively elastic center portion capable of stretch and shrink deformation and extending lengthwise of the belt in side by side relation with relatively inelastic side portions and laterally joined as an integral assembly.

2. In the art of treating solids in liquids in which a pulp containing a range of solids in a variety of sizes is fed into a pool having a substantially flat bottom portion formed on the distorted surface of a moving readily deformable endless belt, wherein the belt rises above the level of the pool at one end thereof to discharge settled solids from the pool, the improvement which comprises a belt arrangement of a relatively inelastic core portion extending lengthwise of the belt in side by side relation with relatively elastic side portions laterally joined as an integral assembly, and an elastic raised edge projection extending upwardly and lengthwise along each edge of said assembly.

3. Apparatus for treating a pulp of solids suspended in liquid comprising a readily deformable endless belt suspended between upper and lower cylindrical pulleys, a frame supporting the upper stretch of said belt in deformed relation to define a pool portion adjacent said lower cylindrical pulley and a sand conveying and elevating portion adjacent said upper cylindrical pulley, said frame including training idlers constructed and arranged to warp said belt as it issues from said lower pulley into a trough-shaped receptacle, and training-troughing idlers for the moving belt in said conveying and elevating portion, said training-troughing idlers including a pivot bearing, a load plate laterally depending from said pivot bearing, a belt bearing roller depending from said plate supported axially above said pivot whereby said roller is rotatable, a pair of side troughing idlers depending from said plate and spaced from said first roller, said troughing idlers being horizontally and vertically rotatable about said mount for troughing the sides of said belt under various load conditions.

4. Apparatus for treating a pulp of solids suspended in liquid comprising a readily deformable endless belt suspended between upper and lower cylindrical pulleys, a frame supporting the upper stretch of said belt in deformed relation to define a pool portion adjacent said lower cylindrical pulley and a sand conveying and elevating portion adjacent said upper cylindrical pulley, said frame including training idlers constructed and arranged to warp said belt as it issues from said lower pulley into a trough-shaped receptacle, and training-troughing idlers for the moving belt in said conveying and elevating portion, said training-troughing idlers including a pivotal bearing mount adapted to be supported on a frame, a plate depending laterally from said pivotal mount, roller means supported on said plate axially aligned with said pivot, and a pair of troughing idlers mounted on said plate remote from said first roller and spaced to trough the edges of said belt, said troughing idlers being horizontally and vertically pivoted on said plate to be adjustable to the operating load conditions of said belt.

5. Apparatus for treating a pulp of solids suspended in liquid comprising a readily deformable endless belt suspended between upper and lower cylindrical pulleys, a frame supporting the upper stretch of said belt in deformed relation to define a pool portion adjacent said lower cylindrical pulley and a sand conveying and elevating portion adjacent said upper cylindrical pulley, said frame including training idlers constructed and arranged to warp said belt as it issues from said lower pulley into a trough-shaped receptacle, and training-troughing idlers for the moving belt in said conveying and elevating portion, said training-troughing idlers including a pivotal bearing mount adapted to be supported on a frame, substantially perpendicular to a carried belt, a plate depending laterally from the upper end of said pivotal mount, an idler roller supported on said plate axially aligned above said pivot, and a pair of troughing idler rollers mounted on said plate remote from said first roller and spaced to trough the opposite edges of a carried belt, said troughing idler rollers being horizontally and vertically pivoted on said plate whereby to adjust to the operating load conditions of said belt.

References Cited in the file of this patent

UNITED STATES PATENTS

| | | |
|---|---|---|
| 781,787 | Prouty | Dec. 7, 1905 |
| 2,102,652 | Shimmin | Dec. 21, 1937 |
| 2,129,853 | Loges | Sept. 13, 1938 |
| 2,169,625 | Weiss | Aug. 15, 1939 |
| 2,179,187 | Kendall | Nov. 7, 1939 |
| 2,264,332 | Peterson | Dec. 2, 1941 |
| 2,314,294 | Wallny | Mar. 16, 1943 |
| 2,417,477 | Finney | Mar. 18, 1947 |
| 2,707,047 | Patzer | Apr. 26, 1955 |